US007283722B2

United States Patent
Kato

(10) Patent No.: US 7,283,722 B2
(45) Date of Patent: Oct. 16, 2007

(54) APPARATUS AND METHOD FOR REPRODUCING VIDEO SIGNALS AS THEY ARE RECORDED

(75) Inventor: Daisaku Kato, Sagamihara (JP)

(73) Assignee: Victor Company of Japan, Ltd. (JP)

( * ) Notice: Subject to any disclaimer, the term of this patent is extended or adjusted under 35 U.S.C. 154(b) by 1160 days.

(21) Appl. No.: 10/193,877

(22) Filed: Jul. 12, 2002

(65) Prior Publication Data

US 2003/0016944 A1    Jan. 23, 2003

(30) Foreign Application Priority Data

Jul. 19, 2001 (JP) .............................. 2001-219421
May 21, 2002 (JP) .............................. 2002-145776

(51) Int. Cl.
*H04N 7/00* (2006.01)
*H04N 5/91* (2006.01)

(52) U.S. Cl. ......................................... 386/46; 386/69
(58) Field of Classification Search ............... 386/1, 386/95, 98, 108, 45, 125–126, 46, 69
See application file for complete search history.

(56) References Cited

U.S. PATENT DOCUMENTS

| 5,371,551 | A | * | 12/1994 | Logan et al. ............... 348/571 |
| 5,394,275 | A | * | 2/1995 | Iketani et al. .............. 386/35 |
| 5,761,180 | A | * | 6/1998 | Murabayashi et al. ... 369/53.44 |
| 6,002,443 | A |   | 12/1999 | Iggulden .................... 348/553 |
| 6,011,594 | A | * | 1/2000 | Takashima ................. 348/565 |
| 6,169,844 | B1 | * | 1/2001 | Arai ............................. 386/83 |
| 6,445,872 | B1 | * | 9/2002 | Sano et al. ................... 386/46 |
| 6,490,001 | B1 | * | 12/2002 | Shintani et al. ............ 348/554 |

FOREIGN PATENT DOCUMENTS

| EP | 0 789 488 A2 | 8/1997 | |
| EP | 0 817 483 A2 | 1/1998 | |
| EP | 1 067 788 AS | 1/2001 | |
| JP | 56-013876 | 2/1981 | ................ 5/48 |
| JP | 62250556 | 10/1987 | |
| JP | 03191682 | 8/1991 | |
| JP | 05-284436 | 10/1993 | ............... 5/445 |
| JP | 09-180295 | 7/1997 | ................ 15/2 |
| JP | 10-117323 | 5/1998 | ................ 5/92 |
| JP | 11-103470 | 4/1999 | ................ 9/74 |
| JP | 2000-156073 | 6/2000 | ............... 27/10 |
| JP | 2002-112197 | 4/2002 | |
| WO | WO 01/11865 A1 | 2/2001 | |

* cited by examiner

*Primary Examiner*—Thai Q. Tran
*Assistant Examiner*—Daquan Zhao
(74) *Attorney, Agent, or Firm*—Renner, Kenner, Greive, Bobak, Taylor & Weber

(57) ABSTRACT

Video signals received on TV channels are recorded and reproduced with time-division compression and decompression to and from a storage medium to allow the video signals to be reproduced while the signals are being recorded. A channel-switching signal is generated when a first TV channel is switched to a second TV channel. Recording of a video signal received on the second TV channel is inhibited for a specific period until a normal video signal received on the second TV channel is gained after the output of the channel-switching signal. Recording of the video signal received on the second TV channel is allowed when the specific period elapses.

3 Claims, 11 Drawing Sheets

APPARATUS AND METHOD FOR REPRODUCING VIDEO SIGNALS AS THEY ARE RECORDED

BACKGROUND OF THE INVENTION

The present invention relates to an apparatus, a method and a program for simultaneous video-signal recording and reproduction in which video and audio signals broadcast on a tuned TV channel are recorded on a storage medium such as a hard disk and at the same time reproduced from the storage medium.

Video signal recording/reproducing apparatus using randomly-accessible storage media such as hard disks have functions of recording several TV programs at the same time, recording and reproducing video signals now on air at the same time (simultaneous recording and reproduction), and so on, thanks to short access time for recording and reproduction.

The video signal recording/reproducing apparatus with a simultaneous recording/reproduction function are available for cache reproduction (playback) for watching a TV program now on air while continuously time-shifting the program from the present to the past, catch-up reproduction in which video signals recorded in the past are reproduced so that the signals catch up with the video signal recorded now, and so on.

These recording/reproducing apparatus will be on the market with ordinary VCRs (Video Cassette Recorders) used as a time-shift machine, thanks to the functionality explained above.

Users usually watch recorded video signals on a monitor TV to which the signals are supplied from a TV tuner installed in an ordinary VCR. It is possible to watch pictures recorded now. It is however impossible to know how the video signals are being recorded on a video tape, for example, whether the video signals are recorded at a high quality or with no failures.

On the contrary, the video signal recording/reproducing apparatus with a simultaneous recording/reproduction function can proceed with recording while reproducing video signals recorded now in real time, thus users are allowed to know any recording failures in real time, for recording with the least failures.

The simultaneous recording/reproduction function is very convenient for users using hard disks because he or she can watch past scenes with simple operations when he or she wants to watch particular scenes during recording or has missed some scenes.

In meeting demands for the simultaneous recording/reproduction function, a personal video recorder (PVR) has been under development.

With the simultaneous recording/reproduction function, users may watch several TV programs almost at the same time while often switching to other TV channels, thus the TV programs being recorded randomly on a hard disk depending on how often switched.

Such frequent channel switching is done by users while watching several TV programs. When watching these recorded TV programs later, users could have uncomfortable feeling against randomly recorded TV programs with lacking continuity for each program. Users could have more uncomfortable feeling against randomly recorded scenes of different category of TV programs than intermittently recorded scenes of one TV program.

Hard-disk recorders must have a variety of functionality for use as a time-shift machine like ordinary VCRs in addition to cache reproduction and catch-up reproduction.

SUMMARY OF THE INVENTION

A purpose of the present invention is to provide an apparatus, a method and a program for simultaneous video-signal recording and reproduction with less distortion of video signals and less uncomfortable feeling to users in reproduction even when the signals are recorded under frequent TV-channel switching, with several functions of, for example, informing users of "under cache reproduction" when he or she switches to another TV channel during cache reproduction.

The present invention provides a method of recording and reproducing video signals received on TV channels with time-division compression and decompression of the video signals to and from a storage medium to allow the video signals to be reproduced while the signals are being recorded, the method including the steps of: generating a channel-switching signal when a first TV channel is switched to a second TV channel; inhibiting recording of a video signal received on the second TV channel for a specific period until a normal video signal received on the second TV channel is gained after the output of the channel-switching signal; and allowing recording of the video signal received on the second TV channel when the specific period elapses.

Moreover, the present invention provides a method of recording and reproducing video signals received on TV channels with time-division compression and decompression of the video signals to and from a storage medium to allow the video signals to be reproduced while the signals are being recorded, the method including the steps of: generating a channel-switching signal when a first TV channel is switched to a second TV channel; obtaining first location information indicating a location of a first video signal recorded in the storage medium, the first video signal being received when the channel-switching signal is generated; obtaining second location information indicating a location of a second video signal recorded in the storage medium, the second video signal being received when a specific period elapses after the generation of the channel-switching signal; and reproducing the second video signal from the storage medium while skipping a signal portion recorded in an area of the storage medium, the area existing between locations indicated by the first and the second location information.

Moreover, the present invention provides a method of recording and reproducing video signals received on TV channels with time-division compression and decompression of the video signals to and from a storage medium to allow the video signals to be reproduced while the signals are being recorded, the method including the steps of: generating a channel-switching signal when a first TV channel is switched to a second TV channel; obtaining first location information indicating a location of a first video signal recorded in the storage medium, the first video signal being received when the channel-switching signal is output; obtaining second location information indicating a location of a second video signal recorded in the storage medium, the second video signal being received when a given period elapses after the output of the channel-switching signal; and erasing a signal portion recorded in an area of the storage medium, the area existing between locations indicated by the first and the second location information.

Furthermore, the present invention provides a method of recording and reproducing video signals received on TV channels with time-division compression and decompression of the video signals to and from a storage medium to allow the video signals to be reproduced while the signals are being recorded, the method including the steps of: recording video signals received on a plurality of TV channels switched from one to another; reproducing the video signals while skipping a recorded video signal portion when a reception time for the recorded video signal portion is shorter than a specific period.

Furthermore, the present invention provides a method of recording and reproducing video signals received on TV channels with time-division compression and decompression of the video signals to and from a storage medium to allow the video signals to be reproduced while the signals are being recorded, the method including the steps of: recording video signals received on a plurality of TV channels switched from one to another; reproducing a video signal received on a first TV channel while staying tuned to a second TV channel; generating channel information indicating the video signal under reproduction being not received on the second TV channel; superimposing the channel information on the reproduced video signal to form a signal to be displayed on a monitor.

Moreover, the present invention provides a method of recording and reproducing video signals received on TV channels with time-division compression and decompression of the video signals to and from a storage medium to allow the video signals to be reproduced while the signals are being recorded, the method including the steps of: reproducing a first video signal from the storage medium; inhibiting the reproduction of the first video signal when a current first TV channel is switched to a second TV channel; and reproducing a second video signal received and recorded on the second TV channel.

Moreover, the present invention provides a method of recording and reproducing video signals received on TV channels with time-division compression and decompression of the video signals to and from a storage medium to allow the video signals to be reproduced while the signals are being recorded, the method including the steps of: reproducing a first video signal from the storage medium; inhibiting the reproduction of the first video signal when a current first TV channel is switched to a second TV channel; and allowing a second video signal received on the second TV channel to be monitored.

Furthermore, the present invention provides a method of recording and reproducing video signals received on TV channels with time-division compression and decompression of the video signals to and from a storage medium to allow the video signals to be reproduced while the signals are being recorded, the method including the steps of: recording video signals received on a plurality of TV channels switched from one to another; reproducing a video signal received on a first TV channel while staying tuned to a second TV channel; generating channel information indicating the video signal under reproduction being not received on the second TV channel; superimposing the channel information on the reproduced video signal; and forming a signal, carrying the reproduced video signal and the channel information, to be displayed on a monitor when the superimposition has been performed for a specific period or more for distinguishing the TV channels for the reproduced video signal.

Moreover, the present invention provides an apparatus for recording and reproducing video signals received on TV channels with time-division compression and decompression of the video signals to and from a storage medium to allow the video signals to be reproduced while the signals are being recorded, including: a generator to generate a channel-switching signal when a first TV channel is switched to a second TV channel; a controller to inhibit recording of a video signal received on the second TV channel for a specific period until a normal video signal received on the second TV channel is gained after the output of the channel-switching signal whereas allow recording of the video signal received on the second TV channel when the specific period elapses.

Furthermore, the present invention provides an apparatus for recording and reproducing video signals received on TV channels with time-divisional compression and decompression of the video signal to and from a storage medium to allow the video signal to be reproduced while the signal is being recorded, including: a generator to generate a channel-switching signal when a first TV channel is switched to a second TV channel; a reproducer to reproduce video signals from the storage medium; and a controller to control the reproducer for reproducing a first video signal from the storage medium while skipping a signal portion recorded in an area of the storage medium, the area existing between a location of a second video signal recorded in the storage medium and another location of the first video signal recorded in the storage medium, the first video signal being received when a specific period elapses after the generation of the channel-switching signal, the second video signal being received when the channel-switching signal is generated.

Moreover, the present invention provides an apparatus for recording and reproducing video signals received on TV channels with time-division compression and decompression of the video signals to and from a storage medium to allow the video signals to be reproduced while the signals are being recorded, including: a recorder to record video signals received on a plurality of TV channels switched from one to another; a reproducer to reproduce a video signal received on a first TV channel while staying tuned to a second TV channel; and a controller to generate channel information indicating the video signal under reproduction being not received on the second TV channel, superimpose the channel information on the reproduced video signal and form a signal, carrying the reproduced video signal and the channel information, to be displayed on a monitor when the superimposition has been performed for a specific period or more for distinguishing the TV channels for the reproduced video signal.

Furthermore, the present invention provides an apparatus for recording and reproducing video signals received on TV channels with time-division compression and decompression of the video signals to and from a storage medium to allow the video signals to be reproduced while the signals are being recorded, including: a generator to generate a channel-switching signal whenever a TV channel is switched to another; a controller to repeatedly obtain location information indicating locations of video signals recorded in the storage medium whenever the channel-switching signal is output; and a reproducer to reproduce each video signal from the storage medium based on the location information.

Moreover, the present invention provides a computer-executable program for recording and reproducing video signals received on TV channels with time-division compression and decompression of the video signals to and from a storage medium to allow the video signals to be reproduced while the signals are being recorded, the program including the instructions for: generating a channel-switching signal when a first TV channel is switched to a second TV channel; obtaining first location information indicating a location of a first video signal recorded in the storage medium, the first video signal being received when the channel-switching signal is generated; obtaining second location information indicating a location of a second video signal recorded in the storage medium, the second video signal being received when a specific period elapses after the generation of the channel-switching signal; and reproducing the second video signal from the storage medium while skipping a signal portion recorded in an area of the storage medium, the area existing between locations indicated by the first and the second location information.

DETAILED DESCRIPTION OF PREFERRED EMBODIMENTS

Preferred embodiments according to the present invention will be disclosed with reference to the attached drawings.

Figure 1:
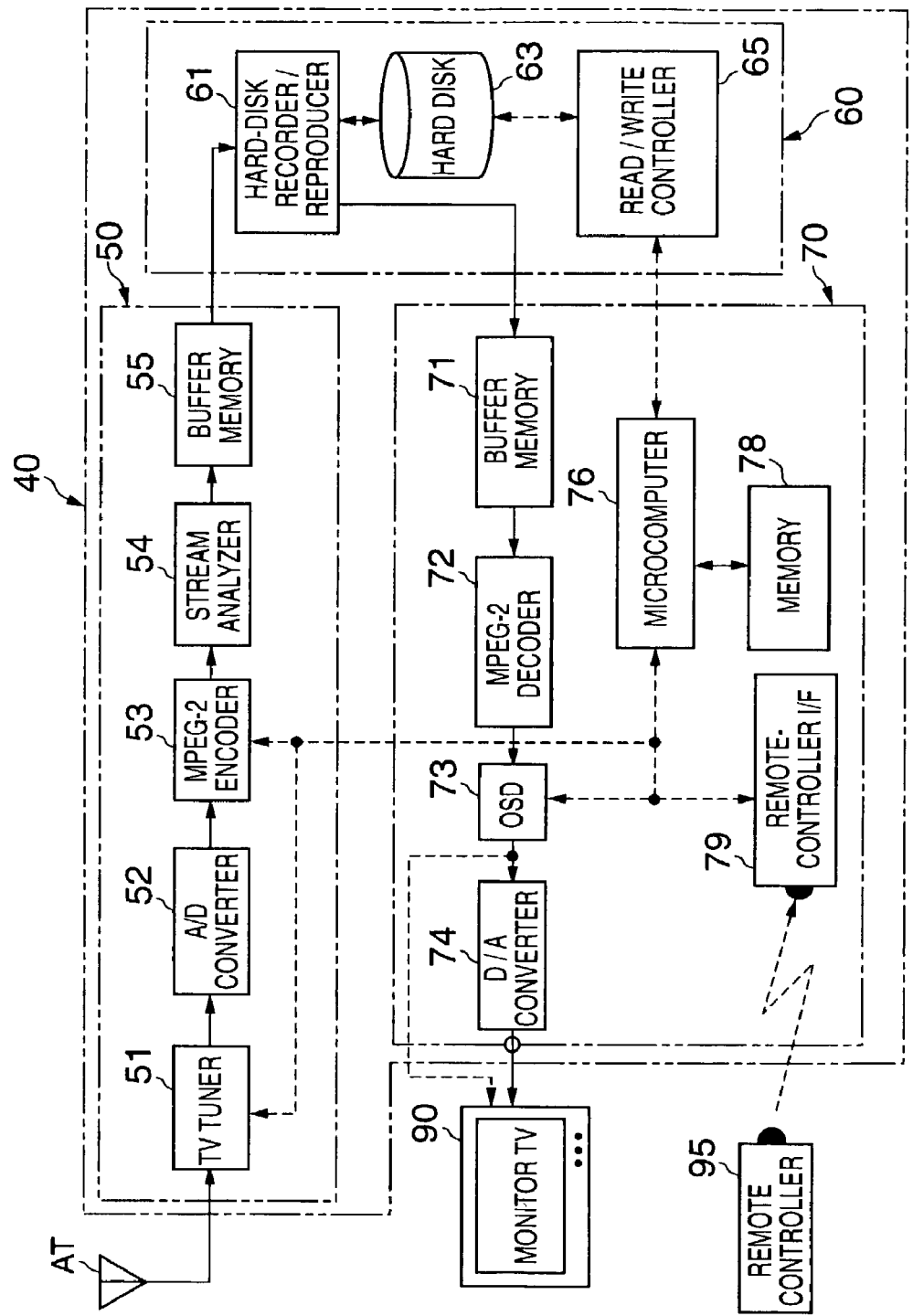
FIG. 1 shows a block diagram of a video signal recording/reproducing apparatus as a preferred embodiment according to the present invention.

FIG. 1 shows a block diagram of a video signal recording/reproducing apparatus (hard-disk recorder) with a simultaneous recording/reproducing function for analog terrestrial-broadcast TV signals according to the present invention.

A video signal recording/reproducing apparatus 40 has a recording section 50, a medium section 60 and a reproducing section 70. A monitor TV 90 is connected to the reproducing section 70. An infrared remote controller 95 is used for wireless communications with the reproducing section 70.

The recording section 50 has a TV tuner 51, an A/D converter 52, an MPEG-2 encoder 53, a stream analyzer 54 and a buffer memory 55. The medium section 60 has a hard-disk recorder/reproducer 61, a hard disk 63 and a read/write controller 65. The reproducing section 70 has a buffer memory 71, an MPEG-2 decoder 72, an OSD (On Screen Display) 73, a D/A converter 74, a microcomputer 76, a memory 78 and a remote-controller interface (I/F) 79.

In recording, a user operates the remote controller 95 to emit an infrared signal for a TV channel of interest. The infrared signal is received by the remote-controller I/F 79. TV-channel information carried by the infrared signal is sent to the TV tuner 51.

The TV tuner 51 extracts a video signal on the user-selected channel among analog terrestrial-broadcast airwaves received via an antenna AT. The video signal is converted into a digital video signal by the A/D converter 52 and supplied to the MPEG-2 encoder 53.

The MPEG-2 encoder 53 compresses the digital video signal to encode the signal under the MPEG-2 (Moving Picture Experts Group-2) standards defined by ISO/IEC (International organization for Standardization/International Electrotechnical Commision).

The encoded bitstream is supplied to the stream analyzer 54 for bitstream analysis. The analysis-resultant signal and the bitstream are both supplied to the buffer memory 55. Signals to be recorded carried by the bitstream are once stored in the buffer memory 55 (for compression on time base) and output to the hard-disk recorder/reproducer 61 in recording order.

The signals to be recorded are divided in accordance with sector size by the hard-disk recorder/reproducer 61. The divided signals are supplied to the hard disk 63 under control by the read/write controller 65, thus being recorded on a circular storage medium (not shown).

As disclosed, the video signal received on the user-selected TV channel and an associated audio signal are encoded into video and audio bitstreams and recorded on the hard disk 63 per sector size.

In reproduction from the hard disk 63, the user operates the remote controller 95, so that an infrared beam modulated under the user-reproduction operation is sent to the microcomputer 76 via the remote-controller I/F 79.

The microcomputer 76 generates a control signal in accordance with the user-reproduction operation. The control signal is sent to the read/write controller 65. A signal recorded at a designated location on the hard disk 63 is retrieved under the control signal and supplied to the hard-disk recorder/reproducer 61.

The hard-disk recorder/reproducer 61 adjusts the retrieved signal for its amplitude and frequency characteristics, etc. The adjusted signal is once stored in the buffer memory 71 (for decompression on time base) and supplied to the MPEG-2 decoder 72 on request.

The signal is decompressed and decoded into a digital video signal by the MPEG-2 decoder 72 under the MPEG-2 standards. The digital video signal is supplied to the OSD 73. The OSD 73 generates a CH (channel)-displaying signal. The decoded digital video signal and the CH-displaying signal are multiplexed into a composite signal which is then sent to the monitor TV 90 via the D/A converter 74. Or, the CH-displaying signal may be directly sent to the monitor TV 90 and multiplexed with the digital signal on the monitor.

Disclosed so far is a hard-disk recorder for its structure and operation for recording of an analog terrestrial-broadcast TV signal received on a user-selected channel on a hard disk with MPEG-2 encoding, and reproduction of the signal with MPEG-2 decoding. The video signal is compressed on time base when recorded on a random-access hard disk and decompressed on time base when reproduced from the hard disk. The time-base compression and decompression achieve simultaneous recording and reproduction of video signals, which will be disclosed later.

This embodiment performs MPEG-2 encoding before recording to the hard disk because analog terrestrial-broadcast video signals have been subjected to analog FM modulation. The A/D conversion and MPEG-2 encoding procedure scan, however, be omitted for broadcast video signals already encoded under the MPEG-2 standards.

Figure 2:
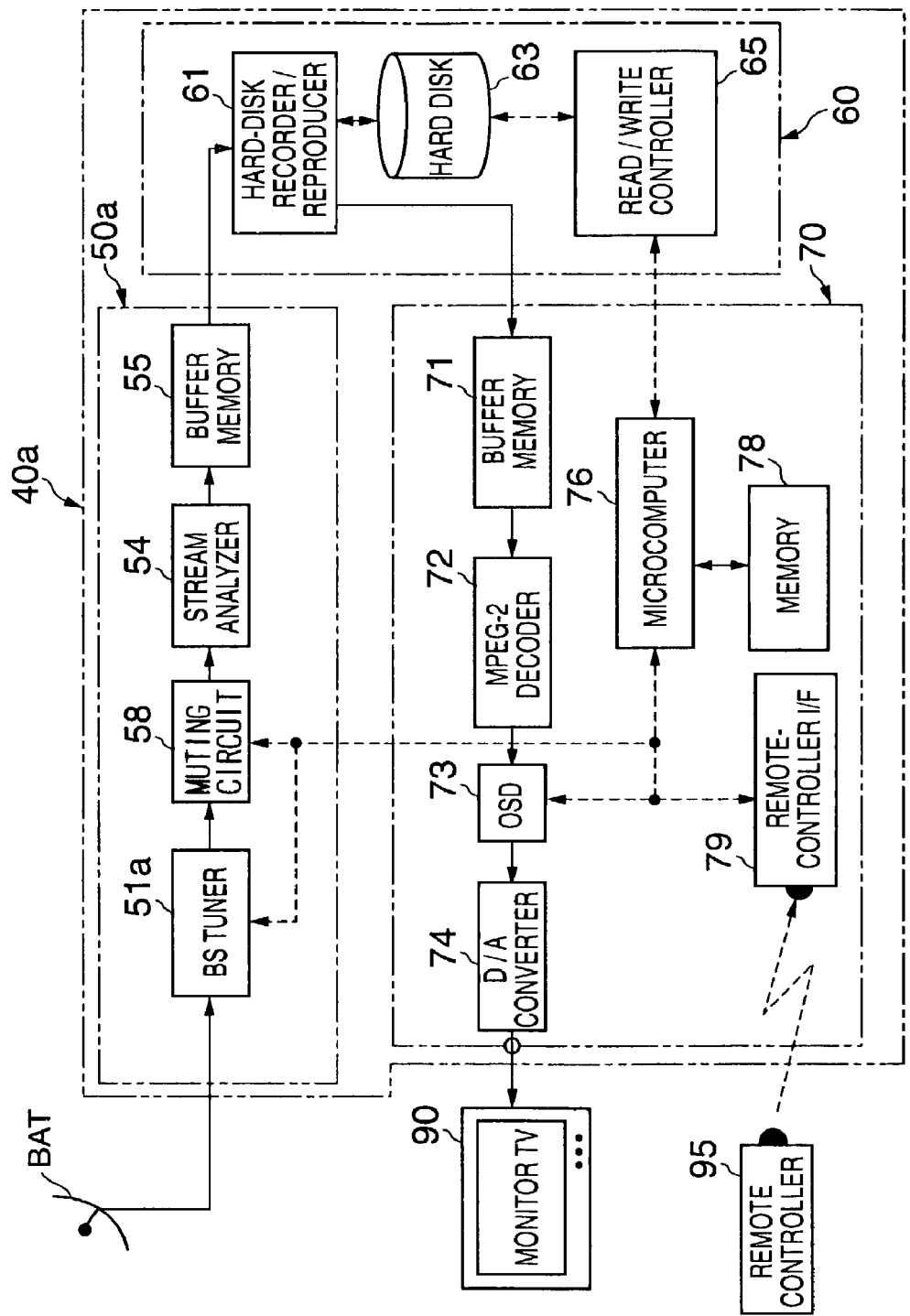
FIG. 2 shows a block diagram of a video signal recording/reproducing apparatus as a preferred embodiment according to the present invention.

FIG. 2 shows a block diagram of a video signal recording/reproducing apparatus (hard-disk recorder) with a simultaneous recording/reproducing function for digital broadcast TV signals according to the present invention.

Elements in this embodiment that are the same as or analogous to elements in the former embodiment (FIG. 1) are referenced by the same reference numbers and will not be explained in detail.

In a video signal recording/reproducing apparatus 40a, digital TV signals broadcast by broadcasting satellites (BS) are received by a BS tuner 51a via a BS antenna BAT. An MPEG-2-encoded digital TV signal received on a TV channel set by the remote controller 95 is extracted and supplied to a muting circuit 58.

The muting circuit 58 supplies only a normal MPEG-2-encoded digital video signal (with no distortion) to the stream analyzer 54. In other words, it will stop the supply of signals to the stream analyzer 54 for a period of time in which no normal MPEG-2-encoded digital video signals are expected to be supplied from the BS tuner 51a due to channel switching, for example. Or, the supply of signals from the muting circuit 58 to the stream analyzer 54 may be brought in a halt until the BS tuner 51a generates a synchronous-capture completion signal or a normal-demodulation detecting signal.

In detail, when a user switches to another channel, a channel-switching operation information is sent from the remote controller 95 to microcomputer 76 via the remote-controller I/F 79. The microcomputer 76 generates a control signal to control the muting circuit 58 until a normal MPEG-2-encoded digital video signal is supplied from the BS tuner 51a.

The normal MPEG-2-encoded digital video signal supplied to the stream analyzer 54 is recorded on the hard disk 63 and reproduced therefrom in the same way disclosed with respect to FIG. 1.

Disclosed above with respect to FIG. 2 is a video signal recording/reproducing apparatus with a simultaneous recording/reproducing function for BS-digital broadcast TV signals. MPEG-2-encoded TV signals may be offered by digital terrestrial broadcasting in addition to BS-digital broadcasting. The video signal recording/reproducing apparatus 40a shown in FIG. 2 can also process such MPEG-2-encoded video signals offered by digital terrestrial broadcasting.

TV signals offered by analog CS (Communication Satellite)-broadcasting may be supplied to the video signal recording/reproducing apparatus 40 in FIG. 1 through a video signal external-input terminal (not shown) via an external analog CS tuner (also not shown). Such signals are supplied to the A/D converter 52 from the external-input terminal and processed like disclosed with reference to FIG. 1.

MPEG-2-encoded digital video signals may be supplied to the video signal recording/reproducing apparatus 40a in FIG. 2 through a video signal external-input terminal (not shown) via an external digital CS tuner (also not shown). Such signals are supplied to the muting circuit 58 from the external-input terminal while the remote-controller I/F 79 gains channel information for those signals by detecting infrared light beams emitted from a digital-CS remote controller (not shown) at the time of channel switching. A channel-switching detecting signal involved in the channel information is sent to the microcomputer 76, the recording and reproduction being the same as disclosed with reference to FIG. 2.

Disclosed so far are preferred embodiments of video signal recording/reproducing apparatus (hard-disk recorder) with a simultaneous recording/reproducing function for analog and digital broadcast TV signals.

In summary, a digital video signal is compressed on time base through the buffer memory 55 and divided into per sector size by the hard-disk recorder/reproducer 61 before recorded on the hard disk 63.

The recorded video signal divided per sector size is recombined when retrieved from the hard disk 63 and sent to the buffer memory 71 for time-base decompression. The decompressed TV signal is decoded by the MPEG-2 decoder 72 to become an analog video signal.

The time-base compression and decompression achieve simultaneous recording and reproduction at different locations on the hard disk (simultaneous recording/reproducing function). The function allows catch-up reproduction to reproduce already-recorded scenes of a TV program that is now being recorded.

Cache recording/reproduction is also achieved in that recorded video and audio signals are reproduced toward the past for a period of interest while the present video and audio signals are overwritten on the oldest signals when recording has proceeded to the last recording area for video and audio bitstreams of a specific period.

The cache recording/reproduction function allows users to replay just-recorded scenes of a TV program as real-time pictures and also already recorded pictures by time-shifting (user operation) from the real-time pictures to the already recorded pictures.

Figure 3:
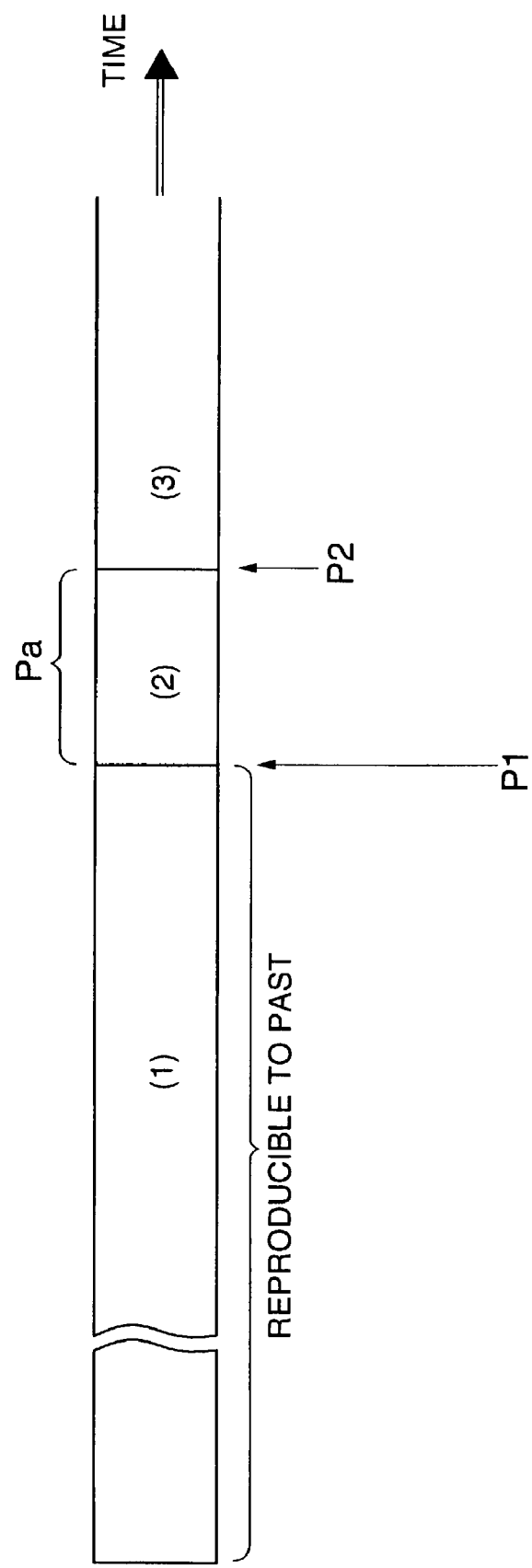
FIG. 3 illustrates bitstreams of video signal to be recorded in a storage medium according to the present invention.

Illustrated in FIG. 3 is a bitstream of video signal in the cache recording/reproduction function. A video bitstream retrieved from the hard disk 63 can be decoded at a point P1 while another encoded video bitstream is recorded on the hard disk at a point P2. A bitstream segment (1) located at the left side of the point P1 can be reproduced toward the past. Another bitstream segment (3) located at the right side of the point P2 has already been recorded on which a new bitstream can be overwritten.

The bitstream segment (1) is followed by the bitstream segment (3) via a segment (2) of bitstream the amount of which is insufficient for stable decoding operation at the MPEG-2 decoder 72 due to incomplete storing of bitstream in the buffer memory 71 working as a VBV (Video Buffering Verifier) buffer, thus no or insufficient amount of bitstream being supplied to the MPEG-2 decoder. In other words, the bitstream segment (2) is stored in the buffer memory 71 for a period Pa until an enough amount of bitstream is stored.

The bitstream segment (1) can only be reproduced from the hard disk 63 after a specific period elapses from the point P2. Reproduction of the bitstream segment (1) at the point P1 (the closest to the point P2) is called a "live state" hereinafter.

Discussed below is TV-channel switching during reproduction in the "live state".

Switching of TV-channel A to TV-channel B in analog TV broadcasting causes a local oscillator (not shown) of the TV tuner 51 to vary its oscillating frequency to tune in to TV channel B. A video signal demodulator (not shown) also tunes into TV channel B. The demodulation starts with automatic adjustments to an operating level of a video signal broadcast on TV channel B, which requires a specific period of delay during which no normal video signals can be gained.

TV-channel switching in satellite TV broadcasting requires a specific period for stable local oscillation over 10 GHz before gaining normal video signals. TV-channel switching to MPEG-2-encoded video signals under BS digital TV broadcasting causes incomplete decoding of encoded signals until I (Intra-coded) frames are decoded. Moreover, TV-channel switching in terrestrial digital broadcasting requires a specific period of synchronization to OFDM (orthogonal Frequency Division Multiplexing) waves having more than 1000 carriers before gaining normal video signals.

As discussed, a certain period of time is required for gaining normal video signals after a user switches to another TV channel. Distorted video signals may be encoded by the MPEG-2 encoder 53 and recorded on the hard disk 63 for a period from switching of TV channels to gaining normal TV signals. Cache reproduction of such distorted video signals is, of course, not suitable.

Reproduction of such distorted video signals may not irritate users when he or she switches to another TV channel. Cache reproduction of distorted video signals could, however, irritate users because distorted pictures recorded past are suddenly displayed on a monitor.

Figure 4:
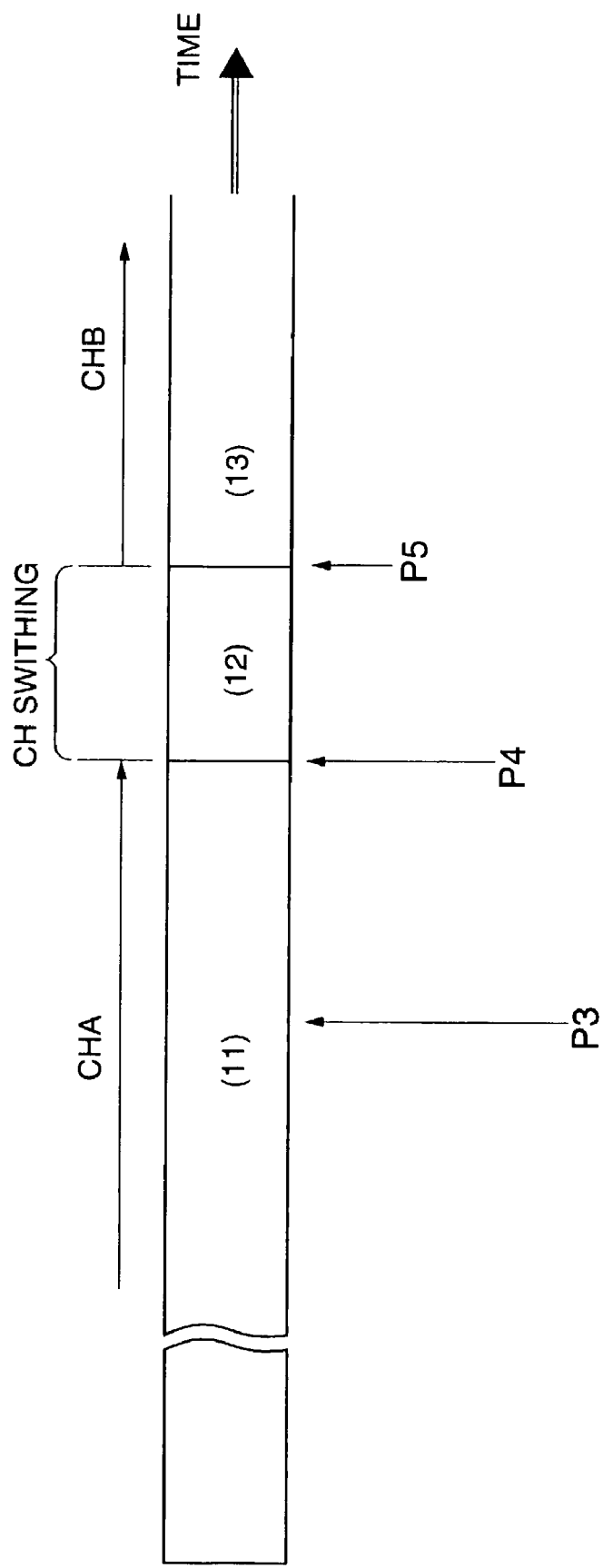
FIG. 4 illustrates pictures to be displayed on monitor on time base during TV-channel switching according to the present invention.

Illustrated in FIG. 4 are pictures to be displayed on monitor on time base during TV-channel switching.

A video area (11) has been recorded on TV channel (CH) A with no distortion, followed by a distorted video area (12) recorded during TV-channel switching and a video area (13) recorded on CH B with no distortion.

A video bitstream received on CH A is recorded on the hard disk 63 at a point P4. An already-recorded bitstream is retrieved from the hard disk 63 and once stored in the buffer memory 71, which can be decoded by the MPEG-2 decoder 72 at a point P3. A video bitstream received on CH B can be reproduced at a point P5 with no distortion.

Figure 5:
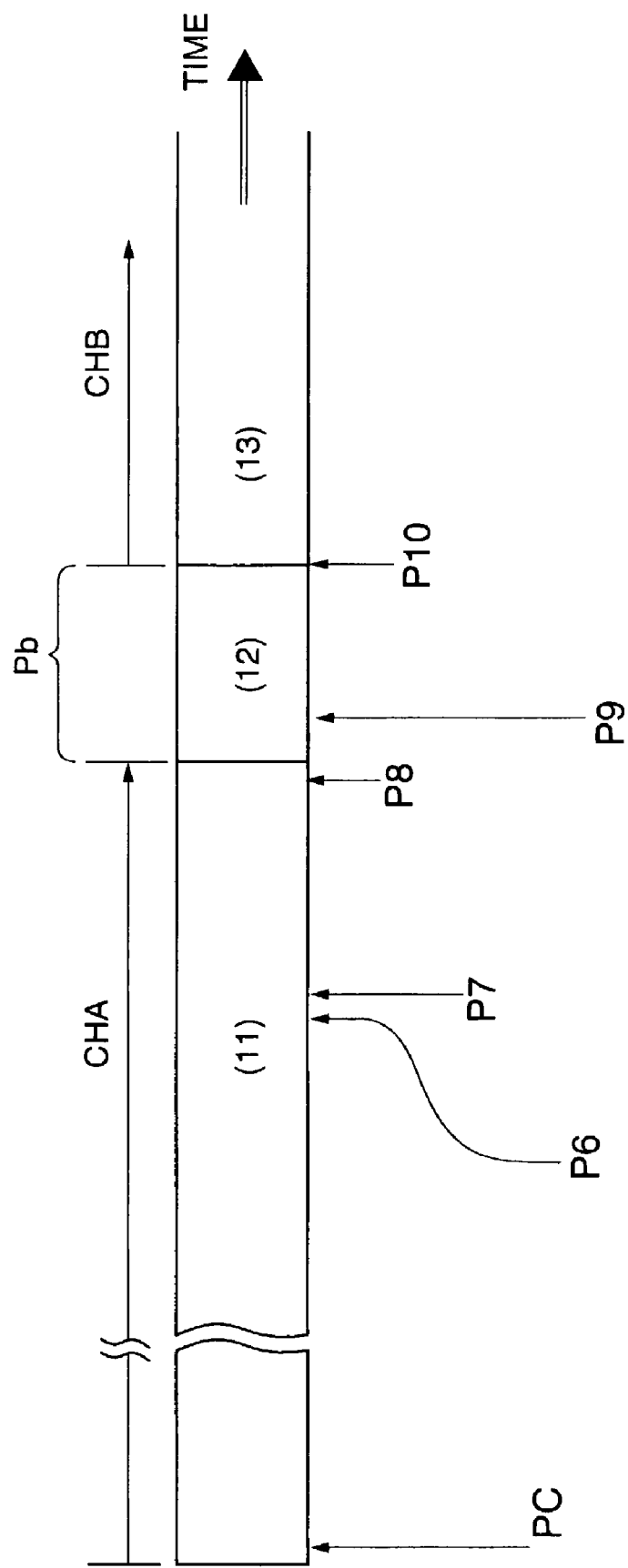
FIG. 5 illustrates bitstreams of video signal to be recorded on time base during TV-channel switching according to the present invention.

Disclosed next with reference to FIG. 5 is a method of controlling the MPEG-2 encoder 53 (FIG. 1) so that pictures distorted during TV-channel switching will not be monitored.

An encoded video signal received on CH A is recorded as video area (11) on the hard disk 63, which can be reproduced up to or from a point Pc (reproducible oldest-recorded point) under cache reproduction. A user operation for switching CH A to CH B generates a control signal that brings the MPEG-2 encoder 53 in a halt from encoding operation at a point P6. The TV channel is actually switched from CH A to CH B at a moment P7 after that the MPEG-2 encoder 53 has been brought in a halt, thus video signals distorted due to channel switching being not encoded.

Any encoded signals received on CH A and already stored in the buffer memory 55 can be recorded on the hard disk 63 even after that the MPEG-2 encoder 53 has been brought in a halt from encoding operation. Recording halts at a point P8 just before the end of the video area (11) received on CH A, so that no signals will be recorded in the video area (12), thus signals distorted due to TV-channel switching being not reproduced.

The TV tuner 51 (FIG. 1) has proceeded synchronizing operation etc., from the point P7, for gaining normal video signals received on CH B. Normal video signals are actually gained at a point P9. The MPEG-2 encoder 53 resumes the encoding operation at the point P9 when a tuning-completion signal is supplied from the TV tuner 51, thus signals distorted due to TV-channel switching being not encoded and thus not recorded for a period Pb.

The method of controlling the MPEG-2 encoder 53 disclosed above also prevents encoding of noise signals which may otherwise be performed due to erroneous tuning into TV channels on which no TV programs have been broadcast or no signals being received after broadcasting stops at the end of the day.

The MPEG-2 encoder 53 is further controlled in the present invention such that it resumes the encoding operation when a predetermined period, for example 500 milliseconds, elapses after the user channel-switching operation. This resumption of encoding is particularly suitable for video signals supplied via an external input terminal, for which synchronization signals are hardly gained.

A video signal is received at a point P10 (FIG. 5) with no distortion at the switched channel CH B and supplied to the MPEG-2 encoder 53. The encoder 53 then resumes recording of the video signal received on CH B in a video area (13).

The resumption of encoding at the MPEG-2 encoder 53, however, causes non-sequential time stamps for encoded signals (bitstreams) to be recorded, thus could distort sequences of reproduced signals. In order to restrict such distortion, information indicating the time stamps being non-sequential are also recorded with the encoded signals according to the present invention.

As disclosed, since no video signals distorted due to TV-channel switching will be recorded on the hard disk 63, cache reproduction of normal video signals is achieved.

Such signals distorted due to TV-channel switching may be eliminated using mute signals for video and audio signals to be supplied to an MPEG-2 encoder that continues encoding without interruption, which depends on the type of MPEG-2 encoder. Mute signals such as monochrome or multiple-color signals may be encoded under the MPEG-2 standards and stored in memory for use in muting.

Figure 6:
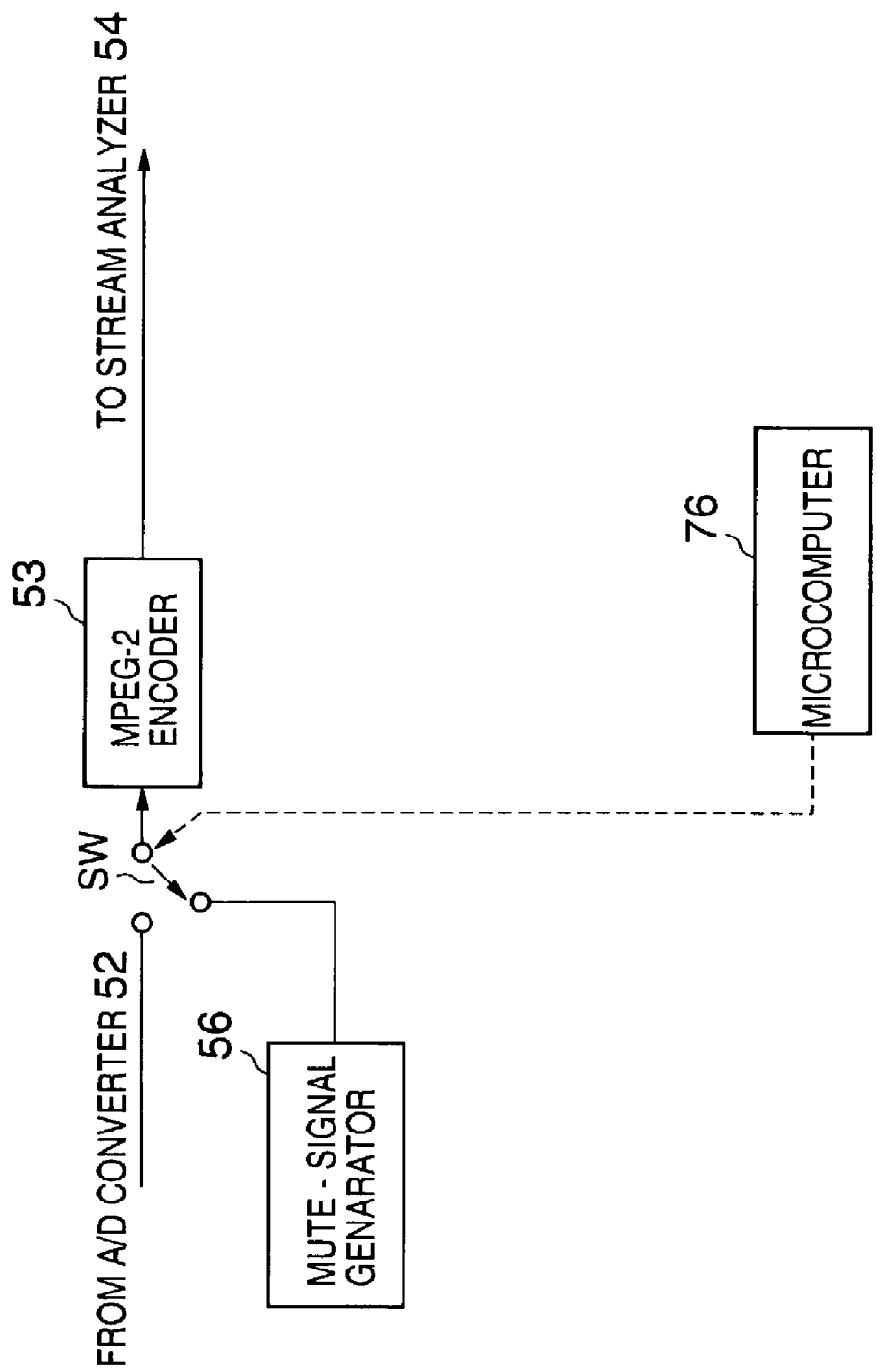
FIG. 6 shows a signal-switching section, a modification to the video signal recording/reproducing apparatus shown in FIG. 1.

FIG. 6 shows a modification to the video signal recording/reproducing apparatus 40 (FIG. 1), provided with a mute-signal generator.

The modification includes a mute-signal generator 56 and a switch SW provided between the A/D converter 52 and the MPEG-2 encoder 53. The switch SW is controlled by the microcomputer 76 to select either video signals from the A/D converter 52 or mute signals from the mute-signal generator 56 and supplies the selected signals to the MPEG-2 encoder 53.

In detail, in response to a signal from the remote-controller I/F 79, generated when a user operates the remote controller 95 to switch to another channel, the microcomputer 76 sends a control signal to the switch SW so that the mute signals from the mute-signal generator 56 will be supplied to the MPEG-2 encoder 53. The microcomputer 76 sends another control signal to the switch SW when a predetermined period such as 500 milliseconds elapses so that the video signals from the A/D converter 52 will be supplied again to the MPEG-2 encoder 53.

This muting process prevents cache reproduction of video signals distorted due to TV-channel switching without interrupting the MPEG-2 encoder 53 for encoding operation.

The MPEG-2 encoder 53 may have a muting function to generate muting signals in response to a control signal from the microcomputer 76 so that it can supply encoded muting signals to the stream analyzer 54 without encoding video signals distorted at the TV tuner 51 due to TV-channel switching. This arrangement eliminates the switch SW and the mute-signal generator 56 shown in FIG. 6.

The muting process disclosed above is to mute video signals. Audio signals must also be muted at the time of TV-channel switching. The audio signals are processed as silent signals.

As disclosed above with respect to FIG. 6, muting signals are supplied to the MPEG-2 encoder 53 instead of video signals distorted due to TV-channel switching. The MPEG-2 encoder 53 then encodes muting signals instead of distorted video signals.

Disclosed next is to eliminate distorted video signals from output signals when the MPEG-2 encoder 53 encodes such distorted video signals with no muting process.

In summary, bitstreams of video signals encoded by the MPEG-2 encoder 53 are divided per sector and recorded on the hard disk 63 in accordance with disk-management information. The disk-management information includes addresses to be recorded on the hard disk 63 and locations (on the hard disk) of I frames (pictures) of each GOP (Group of Pictures) in an MPEG-2-encoded pictures.

The bitstreams of video signals encoded by the MPEG-2 encoder 53 are supplied to the hard disk 63 via the stream analyzer 54, the buffer memory 55 and the hard-disk recorder/reproducer 61, as shown in FIG. 1.

The bitstreams are recorded on predetermined recording areas by the hard-disk recorder/reproducer 61 under control by the read/write controller 65 based on the disk-management information generated by the microcomputer 76.

When a user operates the remote controller 95 to switch to another channel, the remote-controller I/F 79 sends a signal to the microcomputer 76 to write flag information indicating TV-channel switching into the disk-management information for a specific period such as 500 milliseconds.

The read/write controller 65 refers to the disk-management information to control cache reproduction so that bitstreams are retrieved from the hard disk 63 while skipping bitstream portions corresponding to the flag information.

Not only the disk-management information, the flag information may be recorded in a header area of each bitstream so that the read/write controller 65 can stop or perform cache reproduction for any bitsteam by referring to the flag information recorded in its header area. Moreover, the flag information may be stored in the memory 78.

Skipping signals stored in a random access storage medium such as the hard disk 63 can be done in almost the same way for skipping recorded commercial messages (CM) disclosed, for example, in Japanese Unexamined Patent Publication No. 2000-293739.

The CM skipping disclosed in the Japanese Unexamined Patent Publication is to distinguish CM signals recorded on a hard disk from video signals of a TV program by referring to CM flags set in management information area, for skipping or rapidly reproducing the CM signals.

Commercial messages can be reproduced rapidly by high-speed reproduction and used as time pointers in a TV program. On the contrary, signals distorted due to TV-channel switching cannot be used as such time pointers and hence should be skipped.

The skipping operation could cause instantaneous freezing of pictures on monitor. Frozen pictures, however, cause almost no problems for viewing because TV-channel switching is performed at user's will.

As disclosed, cache reproduction will not be applied to video signals distorted due to TV-channel switching under disk management using flags. Distorted video signals distinguished from normal video signals by means of the flags may not be recorded or may be erased from the hard disk after recorded. For example, instead of such distorted video signals, management information indicating "unrecorded" maybe recorded. Or, such distorted video signals may be erased from the hard disk after recorded on the basis of the flags.

Disclosed next is signal processing against TV-channel switching performed several time for relatively a short period of time.

Figure 7:
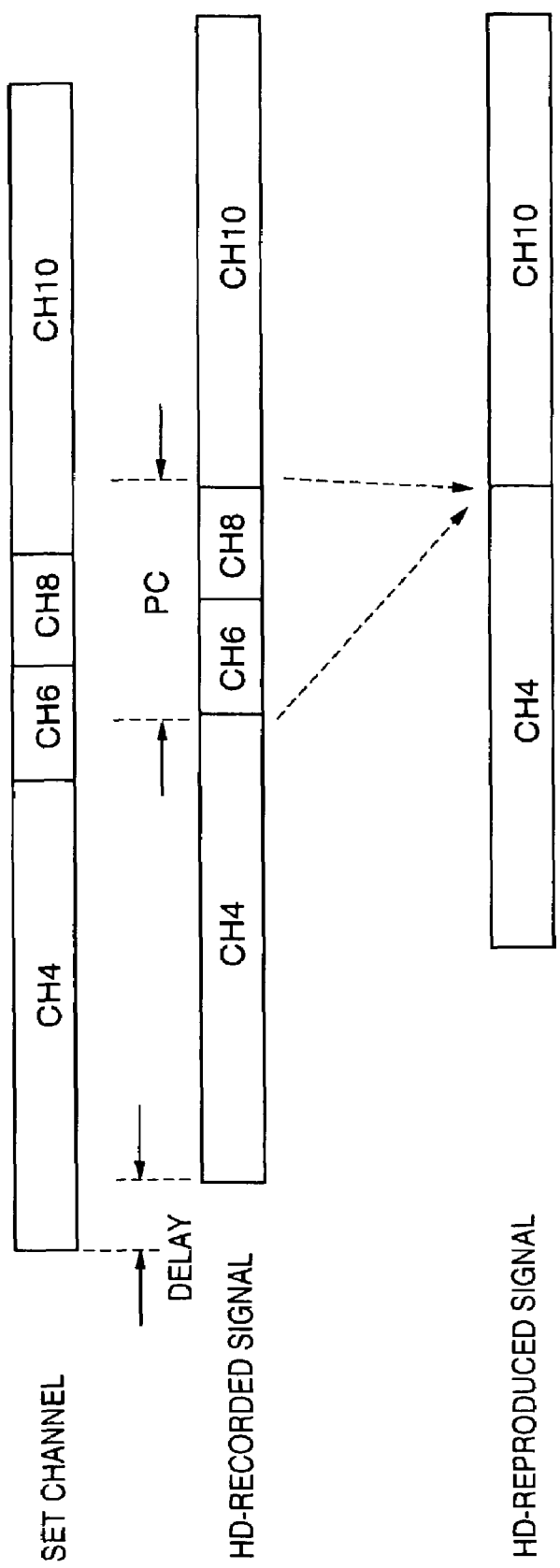
FIG. 7 illustrates channel skip in several times of TV-channel switching according to the present invention.

Illustrated in FIG. 7 is several times of TV-channel switching in that channel (CH) 4 on which a user is watching a TV program is switched to CH6 and then CH8 for a very short time, respectively, and further to CH10 on which the user watch another TV program.

In FIG. 7, SET CHANNEL indicates the transition of TV channels from CH4 to CH10 via CH6 and CH8 set by the remote-controller I/F 79 in response to user operation to the remote controller 95, HD-RECORDED SIGNAL the transition of signals on CH4, CH6, CH8, and CH10 recorded on the hard disk (HD) 63, each delayed by a specific period through the MPEG-2 encoder 53 and the buffer memory 55, etc., and HD-REPRODUCED SIGNAL the transition of signals on CH 4 and CH10 reproduced from the hard disk 63.

The channel transition indicated in SET CHANNEL happens, for example, when a user depresses a channel-up button on the remote controller 95 several times. In this invention, it is determined that a user will not watch any programs on CH 6 and CH8 especially when these channels are switched by 1 seconds or less.

Cache reproduction achieves replay of TV programs recorded during channel-switching performed several times. It is, however, has a problem with frequent TV-channel switching. Suppose that a user watches a TV program on CH6 for a short period such as 10 seconds during cache recording/reproduction. In reproduction, this TV program is reproduced for 10 seconds, followed by pictures on the next channel with no distortion as already disclosed, which may otherwise occur due to TV-channel switching. Such discontinuous pictures of different TV programs could, however, make a user uncomfortable.

Such short-period pictures on a particular channel can be skipped in reproduction by means of a flag recorded in the management area in the same way as described above. Or, such pictures may be erased from the hard disk based on the flag after recorded.

In detail, video signals received on CH6 and CH8 are recorded with flags so that video signals received on CH10 will follow those on CH4 in reproduction while those on CH6 and CH8 will be skipped for a skip period Pc, as indicated in HD-RECORDED SIGNAL and HD-REPRODUCED SIGNAL in FIG. 7.

As disclosed above, skip reproduction of video signals on TV channels viewed for a very short time achieves smooth reproduction of TV programs of high interest. Thus, this type of cache reproduction offers users very comfortable TV viewing. This cache reproduction is also controlled by the microcomputer 76.

Moreover, information on TV channels, input sources, etc., on monitor with pictures in cache reproduction are beneficial to users.

TV-channel information can be stored in the memory 78 as management information which will be displayed on the monitor TV 90 as being superimposed on pictures through the OSD (On Screen Display) 73.

A regular OSD function offers a display of a present TV-channel number when switched from a former channel. The present channel number will disappear when a predetermined period elapses whereas pictures on the present channel number are continuously displayed.

An OSD function in this invention offers a display of TV-channel information when pictures on a channel are to be reproduced, which are different from pictures on a present channel now under cache reproduction. This function offers users information that pictures now under cache reproduction were received on a TV channel that is different from the one on which he or she has watched pictures until now under cache reproduction.

The OSD function in this invention further offers a display of a sign such as "**" super imposed on pictures, which indicates that the input source for pictures now under cache reproduction is unidentified when the pictures have been recorded through an external input terminal or no TV-channel information is available for the pictures due to an unidentified input source.

Suppose that a user is watching a TV program on CH8 in the "live state" described before with respect to FIG. 3 under cache reproduction while TV stays tuned to CH8 after he or she watched another TV program on CH10 10 minutes ago and further had watched the former or still another TV program 15 minutes ago on CH8.

Under the OSD function in this invention, the TV channel "CH8" will be displayed as the TV-channel information during cache reproduction of pictures for 10 minutes to the past from the "live state", the sign "**" or "CH10" being displayed for further several minutes to the past.

Figure 8:
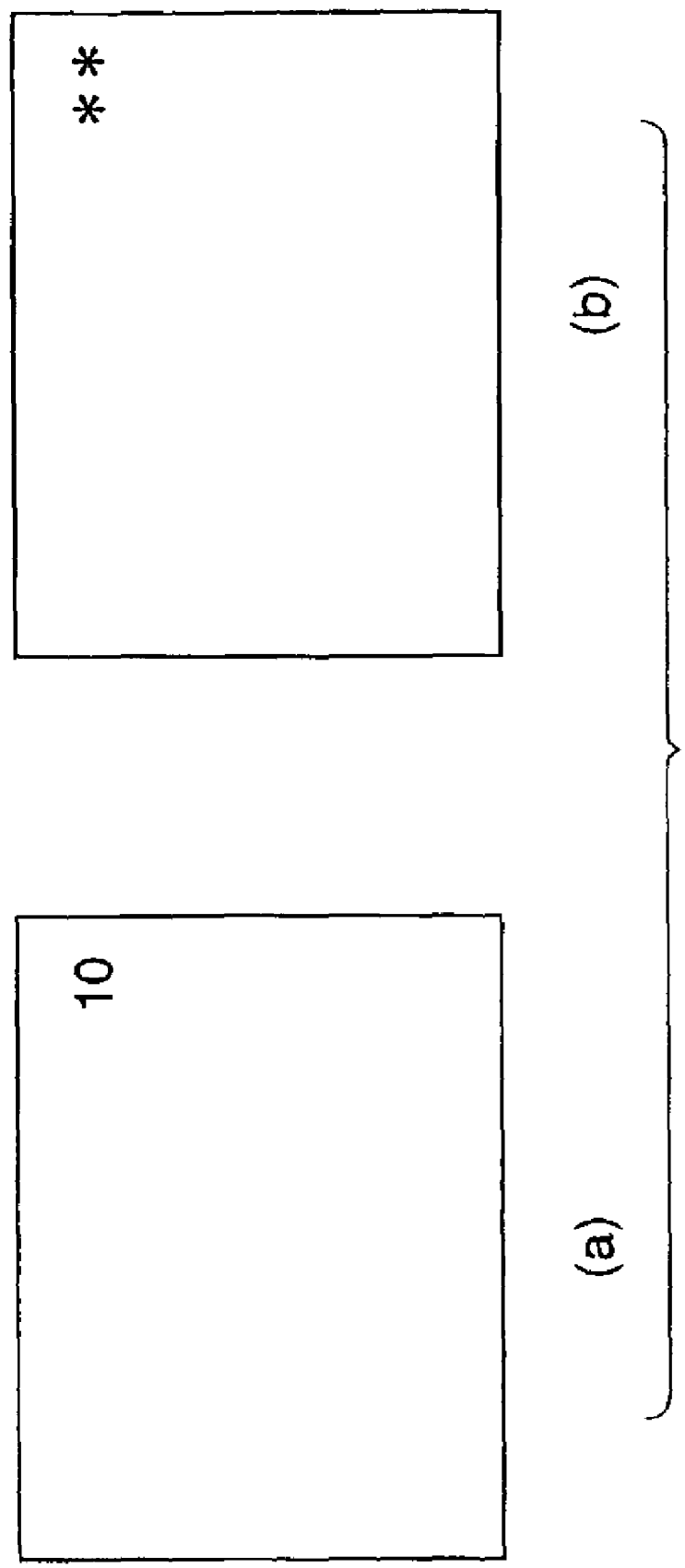
FIG. 8 illustrates TV-channel information displayed on monitor in cache recording/reproduction according to the present invention.

Illustrated in FIG. 8 are TV-channel information displayed on monitor. The channel number "10" will be displayed, for example, with pictures on CH10 under cache reproduction while recording is being proceeded on the same channel CH10, as shown in FIG. 8(a). On the contrary, the sign "**" will be displayed with pictures, for example, on CH10 under cache reproduction while recording is being proceeded on a TV channel different from CH10, as shown in FIG. 8(b).

As disclosed, the TV-channel information such as the sign "**" informs a user that it is under cache reproduction on two or more of TV channels. This function prevents unnecessary channel switching which may otherwise be done by the user when he or she forgets that it is under cache reproduction on two or more of TV channels and hence thinks that the TV channel has not been changed.

Continuous cache reproduction on two or more of TV channels could cause a user, for example, to think that the TV channel has not been changed. Therefore, when the user has changed the TV channel during cache reproduction, it is checked whether he or she has changed the TV channel on purpose or mistakenly.

In detail, pictures on monitor now under viewing are switched to those under the "live state" in the invention when a user has changed the TV channel during cache reproduction on TV channels different from the one under recording. This function informs the user that the channel switching has been performed to the channel under recording.

It is also preferable to allow channel switching based on the user's response to an inquiry about necessity of channel switching to pictures in the "live state".

In detail, the present invention provides a single user channel-switching action to change the mode to the "live state" to effect channel switching and a double user channel-switching action in which the initial user action changes the mode to the "live state" to display pictures under recording and the following action effects channel switching.

The single user channel-switching action allows a user to switch the TV channel again to the former one when he or she recognizes mis-channel-switching, which causes missing of some pictures due to cache reproduction, but tolerable in practical use.

A user can choose either the single or the double user channel-switching action for channel switching under cache reproduction at any moment elapsing from the "live state".

The double user channel-switching action to once change the mode to the "live state" before channel switching causes less mis-channel-switching in the cache recording/reproduction function for pictures on several TV channels to/from one cache memory.

The OSD function in this invention further gives a message on monitor to indicate a TV program now on monitor is different from the previous one during cache reproduction of TV programs on several channels. The message may be the sign "**" or TV-channel information corresponding to a TV program on a switched channel.

As disclosed, the present invention offers time-division TV viewing for several broadcast TV programs stored in a cache memory. This function gives users multiple choices in viewing TV programs such as repeat reproduction at any reproduction speed for TV programs of most interest stored in the cache memory.

Disclosed next is an index-searching function according to the present invention.

Figure 9:
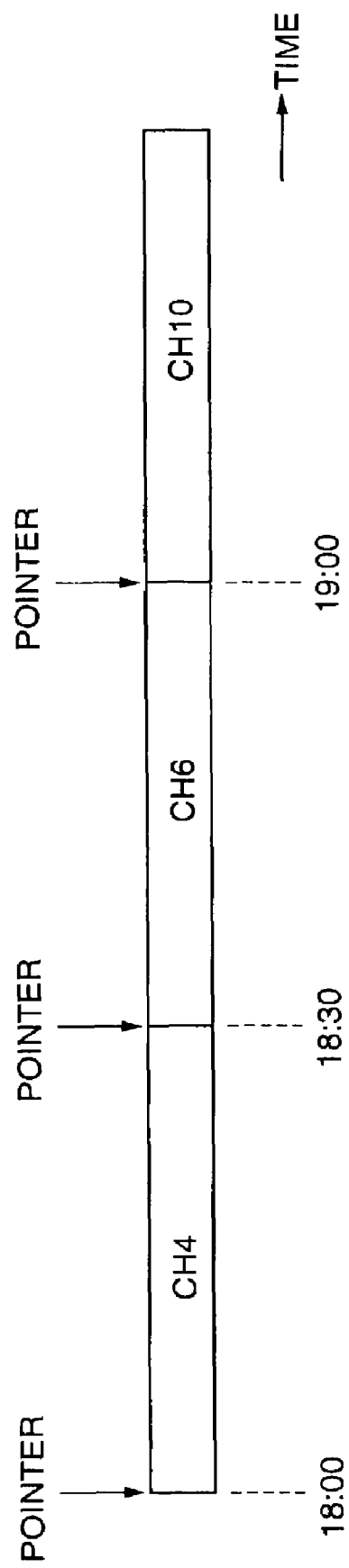
FIG. 9 illustrates recording time and recorded TV channels in timer cache recording according to the present invention.

Illustrated in FIG. 9 is recording time and recorded TV channels in cache recording using a cache memory, like timer recording. FIG. 9 indicates cache recording on CH4 from 18:00, CH6 from 18:30 and CH10 from 19:00.

This timer cache recording requires pointer settings at a recording starting point on each TV channel for user access to TV programs. Indexing data on the location of bitstream in cache memory corresponding to each pointer is stored in the memory 78. Reproduction of a TV program recorded by the timer cache-recording starting, for example, at 19:20 effects reproduction of pictures recorded at 18:00 at first, followed by reproduction with an index search for a TV program recorded at 18:30 using the pointers (indexing data at 18:00, 18:30 and 19:00) according to a user's preference.

The index search to 18:00, 18:30 and 19:00 can also be achieved by reproduction at channel-switching points found based on the channel information included in the disk-management information.

The reproduction with the index search requires only a few times of operation to the remote controller 95 for searching a pointer as an indexing signal to reproduce the TV program recorded at 19:00, 18:30 or 18:00. This reproduction technique offers high functionality compared to fast forward of the TV programs from 18:00 to 18:30.

The video signal recording/reproducing apparatus according to the present invention achieves the index search disclosed above in addition to reproduction based on broadcast TV channel information recorded in the management area of the disk-management information that also includes information on address to be recorded on a hard disk.

Disclosed so far are several embodiments of video-signal recording/reproduction method and apparatus with the cache recording/reproduction function. The method and operation of the apparatus can be executed under computer programs stored in the microcomputer 76.

Figure 10:
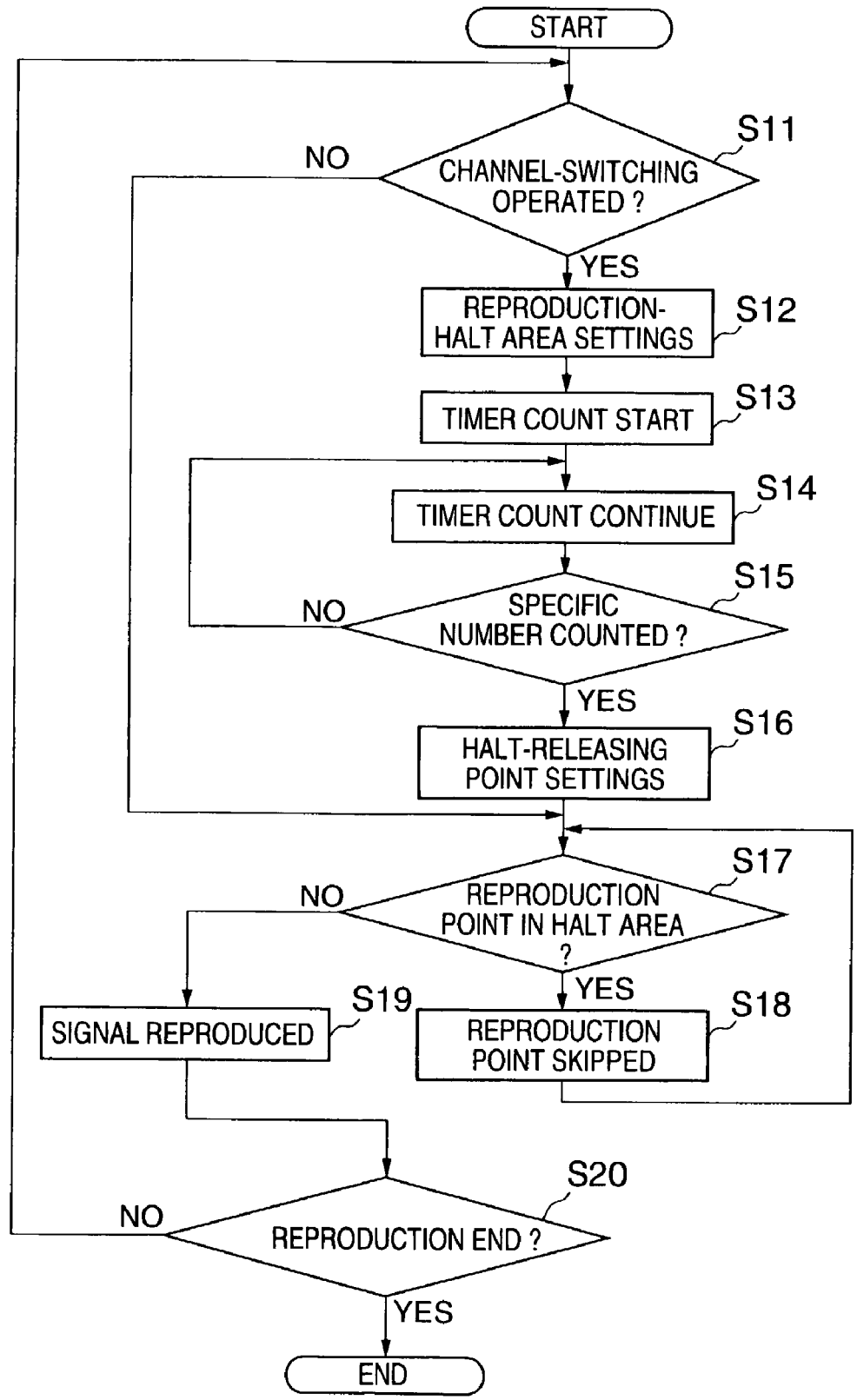
FIG. 10 shows a flowchart indicating operations of the video signal recording/reproducing apparatus according to the present invention.

An operation of the video signal recording/reproducing apparatus (FIG. 1) according to the present invention will be explained in detail with reference to a flowchart shown in FIG. 10.

A program for executing the steps shown in the flowchart can be stored in the memory 78 connected to the microcomputer 76.

When a user operates the remote controller 95 for TV-channel switching, the operation is informed to the microcomputer 76 via the remote-controller I/F 79 to detect the channel-switching operation in step S11.

The program goes to step S17 if no channel-switching operation is detected (NO in step S11). On the contrary, the program goes to step S12, if the channel-switching operation is detected (YES in step S11), to send a detection signal to the MPEG-2 encoder 53, generated by the microcomputer 76 at the detection of channel-switching operation, and give a flag signal on a halt of reproduction to each video signal to be compressed under the MPEG-2 standards.

Then, the program goes to step S13 to start timer count at the microcomputer 76, which continues in step S14. It is checked in step S15 whether the timer count has reached a specific number. The specific number corresponds to a period from a moment of TV-channel switching to another moment of supply of normal video signals on the switched channel from the TV tuner 51.

If "YES" in step S15, in other words, when the timer count has reached the specific number, a setting is made, in step S16, for releasing the flag signals on a halt of reproduction set in step S12.

The video signals are recorded on the hard disk 63 and then reproduced. There production is performed while the flag signals are not detected in step S17. In detail, video signal portions with the flag signals on a halt of reproduction are skipped in step S18 whereas those from which the flag signals have been released (S16) are accessed and reproduced in step S19.

The reproduced video signals are decompressed on time base by the buffer memory 71 and decoded by the MPEG-2 decoder 72.

The reproduction is brought in a halt if "YES" in step S20 and then a sequence of recording/reproduction operations ends.

The program under which the microcomputer 76 works to execute the steps in the flowchart may be installed in the video signal recording/reproducing apparatus 40 shown in FIG. 1 or downloaded from a provider via the Internet.

This program is also executable to the video signal recording/reproducing apparatus 40a shown in FIG. 2 for cache recording/reproduction with no generation of abnormal video signals at TV-channel switching.

Discussed next is time delay generated in cache recording/reproduction.

Cache recording/reproduction of TV programs sometimes requires a real-time check on whether video and audio signals are being recorded with high quality. Such a real-time check will be performed even if it takes time due to time delay in cache recording/reproduction for TV programs of high interest for which recording failure will not be tolerated. It is, however, feasible, to perform recording while reproducing signals of less time delay for TV programs of not so interest.

Figure 11:
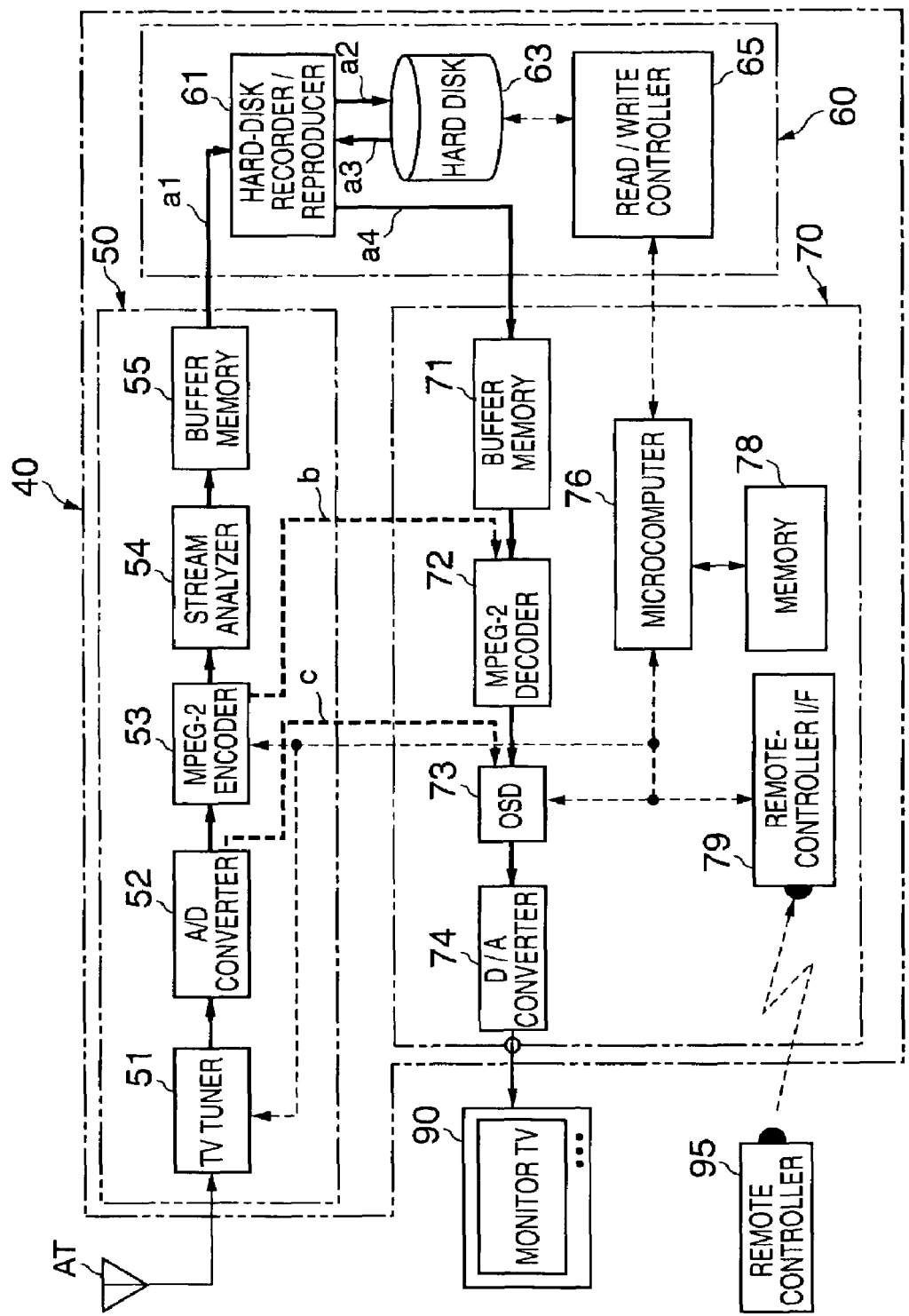
FIG. 11 illustrates signal flows in several types of reproduction of recorded signals or signals to be recorded according to the present invention.

Illustrated in FIG. 11 are several types of reproduction of recorded signals or signals to be recorded.

A first type is reproduction of signals recorded on the hard disk 63, indicated with thick arrows a1 to a4, as already disclosed. In option, signals can be reproduced just before being recorded on the hard disk 63.

A second type of reproduction is to supply video signals encoded by the MPEG-2 encoder 53 to the MPEG-2 decoder 72, as indicated by a dot line "b", for decoding followed by displaying the decoded signals on the monitor TV 90 for a video-quality check, thus causing less time delay.

This type of reproduction of video signals while the signals are being encoded and also decoded cannot detect any degradation of video signals when occurred due to defects of the hard disk 63.

It is, however, still useful in detection of degradations of video signals on the monitor TV 90, caused by encoding failure at an erroneously set transfer rate for the video signals. The encoding and decoding in the method still, however, cause delay in operation.

Monitoring of video signals with less time delay is achieved by a third type of reproduction in which video signals output from the A/D converter 52 are supplied to the OSD 73 to be displayed on the monitor TV 90 with TV-channel information, etc., under the OSD functions.

This method causes almost no time delay to the received video signals, and hence available for user operations such as superimposing a title on a picture displayed on the monitor TV 90, the picture being derived from a video signal supplied via an external input terminal (not shown) for photographs taken by a camera.

This type of reproduction achieves quick displaying of video signals on a switched TV channel with almost no time delay. Thus, this method achieves high response TV-channel switching. Moreover, this method achieves a quick TV-channel check as to whether it is a right TV channel on which a TV program is being recorded now.

These several types of reproduction or monitoring of video signals (just after converted into digital signals, just after encoded, just before recorded or after recorded on the hard disk) can be selected in accordance with user preferences.

In addition, the video signal recording/reproducing apparatus 40 shown in FIG. 1 can be separated into two components. One is a video signal recording apparatus having the recording section 50 and the medium section 60. The other is a video signal reproducing apparatus having the reproducing section 70. Such a separate component system is also applicable to the video signal recording/reproducing apparatus 40a shown in FIG. 2.

The separated recording and reproducing apparatus can be set in different places and connected via a home network. In detail, one recording apparatus is used as a home server and several reproducing apparatus set in different rooms, as set-top boxes, are connected to the recording apparatus via a home network.

The home server and each set-top box are used as a bitstream transmitter and a bitstream receiver, respectively, connected to each other via high-speed wireless LAN or home LAN. This system allows each user to have an access to video information stored in the hard disk from his or her room through two-way communications so that the user can view the bitstream of the video information on the set-top box.

Moreover, several bitstream transmitters and receivers can be connected to one another via a network to structure a network video system.

A hard disk is used in the embodiments disclosed above, as a storage medium installed in the medium section 60. Not only that, however, any other high-speed accessible storage media, such as, magneto-optical disks, RAM- or RW-type DVDs, semiconductor memories, can be used in this invention.

Furthermore, encoding is performed under the MPEG-2 standards in the embodiments disclosed above. Not only that, however, other encoding techniques, such as, intraframe encoding called Motion JPEG, MPEG-4, MPEG-7, MPEG-21 (to be provided as one of the standards soon), and other fractal compression techniques, can be used in this invention.

As disclosed above in detail, the present invention provides a method, an apparatus and a program for recording and reproducing video signals received on TV channels with time-division compression and decompression of the video signals to and from a storage medium to allow the video signals to be reproduced while the signals are being recorded.

In this invention, a channel-switching signal is generated when a first TV channel is switched to a second TV channel. Recording of a video signal received on the second TV channel is inhibited for a specific period until a normal video signal received on the second TV channel is gained after the output of the channel-switching signal. Recording of the video signal received on the second TV channel is then allowed when the specific period elapses. A mute signal or a prepared video signal may be recorded in the storage medium for the specific period under the time-division compression.

These functions offer cache recording/reproduction with less distortion which may otherwise occur due to the channel switching.

Moreover, in this invention, a channel-switching signal is generated when a first TV channel is switched to a second TV channel. A first video signal is received when the channel-switching signal is generated. First location information is then obtained, which indicates a location of the first video signal recorded in the storage medium. A second video signal is received when a specific period elapses after the generation of the channel-switching signal. And then, second location information is obtained, which indicates a location of the second video signal recorded in the storage medium. The second video signal is reproduced from the storage medium while skipping a signal portion recorded in an area of the storage medium. The area exists between locations indicated by the first and the second location information.

These functions offer cache recording/reproduction with less distortion which may otherwise occur due to channel switching already performed by skipping distorted signals.

Moreover, in this invention, a channel-switching signal is generated when a first TV channel is switched to a second TV channel. A first video signal is received when the channel-switching signal is output. First location information is then obtained, which indicates a location of the first video signal recorded in the storage medium. A second video signal is received when a given period elapses after the output of the channel-switching signal. And then, second location information is obtained, which indicates a location of the second video signal recorded in the storage medium. A signal portion recorded in an area of the storage medium is erased, the area existing between locations indicated by the first and the second location information.

These functions offer cache recording/reproduction with less distortion which may otherwise occur due to channel switching already performed by erasing distorted signals.

In this invention, the specific period is equal to or longer than a period for staying tuned to the second TV channel. Setting such specific period achieves detection of video signals received on channels while staying tuned to the channels for a relatively long period, thus eliminating reproduction of video signals received for a short period during channel switching.

Furthermore, in this invention, video signals are recorded, which are received on a plurality of TV channels switched from one to another. The video signals are then reproduced while skipping a recorded video signal portion when a reception time for the recorded video signal portion is shorter than a specific period.

These functions also eliminate reproduction of video signals received for a short period during channel switching.

Moreover, in this invention, video signals are recorded, which are received on a plurality of TV channels switched from one to another. A video signal received on a first TV channel is reproduced while staying tuned to a second TV channel. Channel information is generated, which indicates the video signal under reproduction being not received on the second TV channel. The channel information is superimposed on the reproduced video signal to form a signal to be displayed on a monitor. The first TV channel number or a distinguishing sign may be displayed on the monitor as the channel information.

These functions prevent mis-channel-setting operations.

Furthermore, in this invention, a first video signal is reproduced from the storage medium. The reproduction of the first video signal is inhibited when a current first TV channel is switched to a second TV channel. A second video signal received and recorded on the second TV channel is then reproduced.

These functions give users a notice that he or she has made mis-channel-setting operations.

Furthermore, in this invention, a first video signal is reproduced from the storage medium. The reproduction of the first video signal is inhibited when a current first TV channel is switched to a second TV channel. It is then allowed to monitor a second video signal received on the second TV channel. The second video signal allowed to be monitored may be a signal encoded but not recorded or a signal just received on the second TV channel.

These functions offer monitoring of video signals with less time delay.

Furthermore, in this invention, video signals are recorded, which are received on a plurality of TV channels switched from one to another. A video signal received on a first TV channel is reproduced while staying tuned to a second TV channel. Channel information is generated, which indicating the video signal under reproduction being not received on the second TV channel. The channel information is superimposed on the reproduced video signal. A signal, carrying the reproduced video signal and the channel information, is formed to be displayed on a monitor when the superimposition has been performed for a specific period or more for distinguishing the TV channels for the reproduced video signal.

These functions give users a notice that a TV program under reproduction is different from a TV program now being broadcast, thus preventing mis-channel-setting operations.

Moreover, in this invention, a channel-switching signal is generated whenever a TV channel is switched to another. Location information is repeatedly obtained, which indicates locations of video signals recorded in the storage medium whenever the channel-switching signal is output. Each video signal is then reproduced from the storage medium based on the location information.

These functions offer a quick search for recorded TV programs.

What is claimed is:

1. A method of recording and reproducing video signals received on TV channels with time-division compression and decompression of the video signals to and from a storage medium to allow the video signals to be reproduced while the signals are being recorded, the method comprising the steps of:

generating a channel-switching signal when a first TV channel is switched to a second TV channel;

obtaining first location information indicating a location of a first distorted video signal from which the first distorted video signal is recorded in the storage medium, the first distorted video signal being received when the channel-switching signal is generated;

obtaining second location information indicating a location of a second undistorted video signal from which the second undistorted video signal is recorded in the storage medium, the second undistorted video signal being received when a specific period elapses after the generation of the channel-switching signal; and reproducing the second undistorted video signal from the storage medium while skipping a signal portion of the first distorted video signal recorded in an area of the storage medium, the area existing between locations indicated by the first and the second location information.

2. The method of recording and reproducing video signals according to claim 1, wherein the specific period is equal to or longer than a period for staying tuned to the second TV channel.

3. An apparatus for recording and reproducing video signals received on TV channels with time-divisional compression and decompression of the video signals to and from a storage medium to allow the video signals to be reproduced while the signals are being recorded, comprising:

a generator to generate a channel-switching signal when a first TV channel is switched to a second TV channel;

a reproducer to reproduce video signals from the storage medium; and a controller to control the reproducer for reproducing a first undistorted video signal from the storage medium while skipping a signal portion of a second distorted video sicinal recorded in an area of the storage medium, the area existing between a first location of the second distorted video signal recorded from the first location in the storage medium and a second location of the first undistorted video signal recorded from the second location in the storage medium, the first undistorted video signal being received when a specific period elapses after the generation of the channel-switching signal, the second distorted video signal being received when the channel-switching signal is generated.

* * * * *